(12) United States Patent
Son et al.

(10) Patent No.: US 8,548,001 B2
(45) Date of Patent: Oct. 1, 2013

(54) METHOD AND AN APPARATUS FOR CONTROLLING MESSAGES BETWEEN HOST AND CONTROLLER

(75) Inventors: Juhyung Son, Seoul (KR); Seunghyup Ryoo, Seoul (KR); Jaejoon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 13/054,346

(22) PCT Filed: Jul. 17, 2009

(86) PCT No.: PCT/KR2009/003980
§ 371 (c)(1),
(2), (4) Date: Jan. 14, 2011

(87) PCT Pub. No.: WO2010/008249
PCT Pub. Date: Jan. 21, 2010

(65) Prior Publication Data
US 2011/0111778 A1 May 12, 2011

Related U.S. Application Data

(60) Provisional application No. 61/081,739, filed on Jul. 18, 2008, provisional application No. 61/092,067, filed on Aug. 27, 2008, provisional application No. 61/093,359, filed on Sep. 1, 2008.

(51) Int. Cl.
H04J 3/24 (2006.01)
(52) U.S. Cl.
USPC .......................................................... 370/473

(58) Field of Classification Search
None
See application file for complete search history.

(56) References Cited

U.S. PATENT DOCUMENTS

| | | | |
|---|---|---|---|
| 6,979,997 B1 * | 12/2005 | Myers ...................... | 324/750.01 |
| 8,203,426 B1 * | 6/2012 | Hirschfeld et al. ........... | 340/5.7 |
| 2003/0060946 A1 | 3/2003 | Okuyama et al. | |
| 2004/0073939 A1 * | 4/2004 | Ayyagari ...................... | 725/110 |
| 2004/0158333 A1 | 8/2004 | Ha et al. | |
| 2005/0093770 A1 * | 5/2005 | de Bonet et al. ................ | 345/10 |
| 2006/0180666 A1 * | 8/2006 | Yamashita et al. ............ | 235/451 |
| 2008/0126554 A1 | 5/2008 | Sakai et al. | |
| 2008/0133065 A1 * | 6/2008 | Cannon et al. ................ | 700/295 |

FOREIGN PATENT DOCUMENTS

| | | |
|---|---|---|
| EP | 1 809 056 A2 | 7/2007 |
| WO | WO 2007/052994 A1 | 5/2007 |
| WO | WO 2008/065232 A1 | 6/2008 |
| WO | WO 2008/071925 A1 | 6/2008 |

* cited by examiner

Primary Examiner — Anh-Vu Ly
(74) Attorney, Agent, or Firm — Birch, Stewart, Kolasch & Birch, LLP

(57) ABSTRACT

A method for controlling at least one message including at least one command and response corresponding to the at least one command is disclosed. The method comprise generating a concatenated command by combing multiple commands from a sender, the multiple commands having same priority, transmitting the concatenated command from the sender to a receiver, generating a concatenated response message corresponding to the concatenated command by combining multiple responses from the receiver and transmitting the concatenated response message from the receiver to the sender.

9 Claims, 6 Drawing Sheets

Fig. 4

| Transaction Identifier | Definition |
|---|---|
| 0xxxxxxxb | MSBit=0, Transaction initiated by Host |
| 1xxxxxxxb | MSBit=1, Transaction initiated by Controller |
| 00000000b | reserved |
| 11111111b | TRANS_ID_UNUSED: this transaction identifier is used for Events which are not triggered by any Command. |

Fig. 8

| MCF | Description |
|---|---|
| 0b | No Concatenation or Last segment of the message |
| 1b | Additional message for concatenation following |

Fig. 9

| MP Value | Message Priority Type |
|---|---|
| 0b | Low Priority ( Default) |
| 1b | High Priority |

Fig. 10

| MP Value | Message Priority Type |
|---|---|
| 00 | No Priority |
| 01 | Low Priority |
| 10 | Medium Priority |
| 11 | High Priority |

… # METHOD AND AN APPARATUS FOR CONTROLLING MESSAGES BETWEEN HOST AND CONTROLLER

This application is the National Phase of PCT/KR2009/003980 filed on Jul. 17, 2009, which claims priority under 35 U.S.C. 119(e) to U.S. Provisional Application Nos. 61/081,739 filed on Jul. 18, 2008; 61/092,067 filed on Aug. 27, 2008 and 61/093,359 filed on Sep. 1, 2008, all of which are hereby expressly incorporated by reference into the present application.

TECHNICAL FIELD

The present invention relates to a method and apparatus for controlling messages between a host and a controller, and more particularly, to an interface environment for message transmission.

BACKGROUND ART

Recently, a Near Field Communication (NFC) concept as a substitute for wired communication or infrared communication has been introduced to the market. As a result, high-speed data communication can be achieved among a plurality of electronic appliances using a radio frequency instead of a physical cable. In addition, data communication is wirelessly achieved among a plurality of electronic devices, such that there is no need to connect a cable to any devices (for example, a digital camera, a printer, and the like). Based on the above-mentioned Radio Frequency (RF) communication, not only text data but also voice data can be communicated among a plurality of electronic devices.

DISCLOSURE OF INVENTION

Technical Problem

An object of the present invention devised to solve the problem lies on increasing a message transmission rate by ensuring the reliability of message exchange, accurately identifying a message sender, and ensuring compatibility with a plurality of communication protocols for communications with various external communication devices, during communications in radio frequencies.

Technical Solution

In one aspect of present invention the message controlling method includes generating a concatenated command by combing multiple commands from a sender, the multiple commands having same priority, transmitting the concatenated command from the sender to a receiver, generating a concatenated response message corresponding to the concatenated command by combining multiple responses from the receiver, and transmitting the concatenated response message from the receiver to the sender.

The message may include a field indicating a presence of concatenation between messages.

And, the field may indicate that the message is one of concatenated command messages if the field is set to "1", and the filed indicates that the message form no concatenation between messages or the message is a part of final concatenated command messages if the field is set to "0".

And, an exchanging time required for exchanging the concatenated command and response message is defined by a half reduced time rather than the amount of time required for exchanging a command and response which are not concatenated.

The exchanging time may include a communicating time for the sender to receive the concatenated response message after sending the concatenated command to the host. And, the exchanging time may include an inter-message time indicating for the sender to send a new concatenated command message after the communicating time is over.

The concatenated command including information indicating resetting all transmitted messages between the sender and the receiver may have the highest priority.

In another aspect of present invention, the message controlling method includes receiving a command from a sender, the command being defined with a priority information, determining a processing priority based on the priority information, and processing the command according to the determined processing priority.

In one aspect of present invention, the message controlling apparatus includes a controller configured to receive a concatenated command being formed by combing multiple commands having same priority, process the concatenated command according to an order in which the multiple commands are received, generate a concatenated response message corresponding to the concatenated command by combining multiple responses, and transmit the concatenated response message.

In another aspect of present invention, the message controlling apparatus includes a controller configured to receive a command being defined with a priority information, determine a processing priority based on the priority information, and process the command according to the determined processing priority.

Advantageous Effects

The present invention ensures the reliability of a message exchange by immediately notifying the other entity of a transmission result during the message exchange between a host and a controller.

The present invention also reduces errors in processing a command through accurate identification of a message sender.

The present invention increases transmission rate by message concatenation.

Finally, the present invention enables compatibility with a plurality of communication protocols during communication with various external communication devices.

BRIEF DESCRIPTION OF DRAWINGS

The accompanying drawings, which are included to provide a further understanding of the invention, illustrate embodiments of the invention and together with the description serve to explain the principle of the invention.

IN THE DRAWINGS

Figure 1:
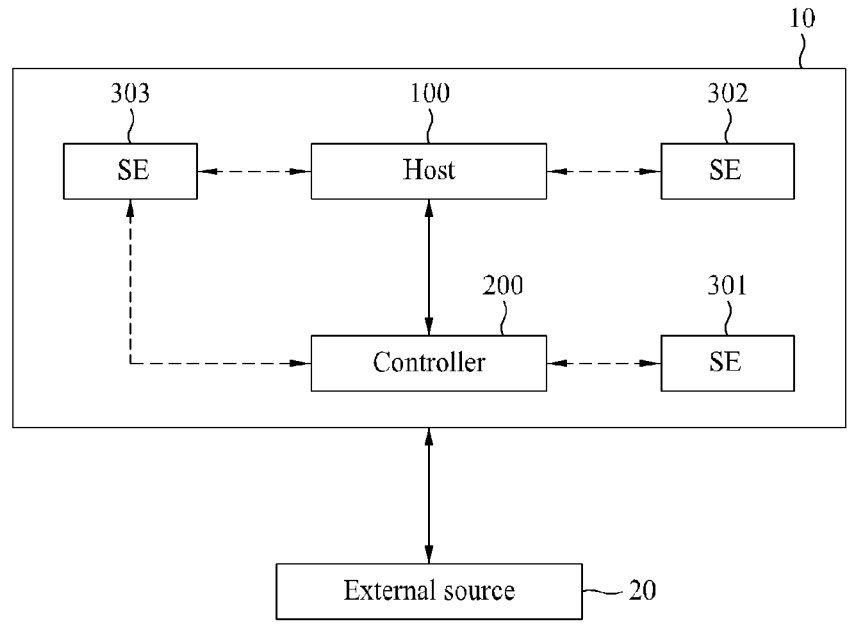

FIG. 1 is a block diagram of an overall system according to the present invention.

Figure 2:
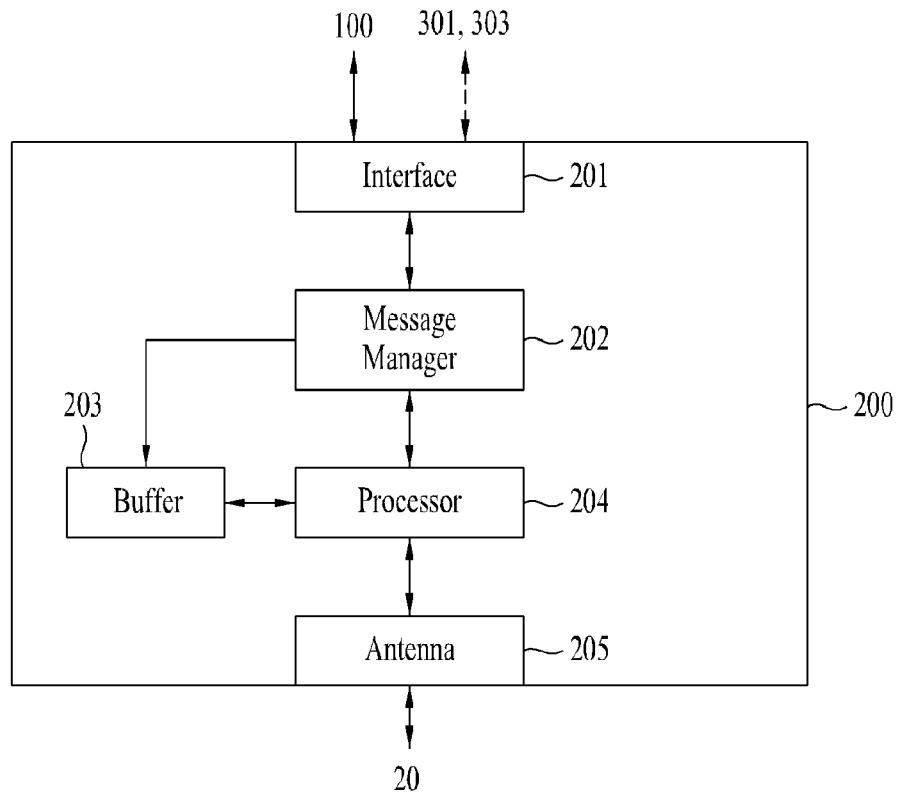

FIG. 2 is a block diagram of a controller illustrated in FIG. 1.

Figure 3:
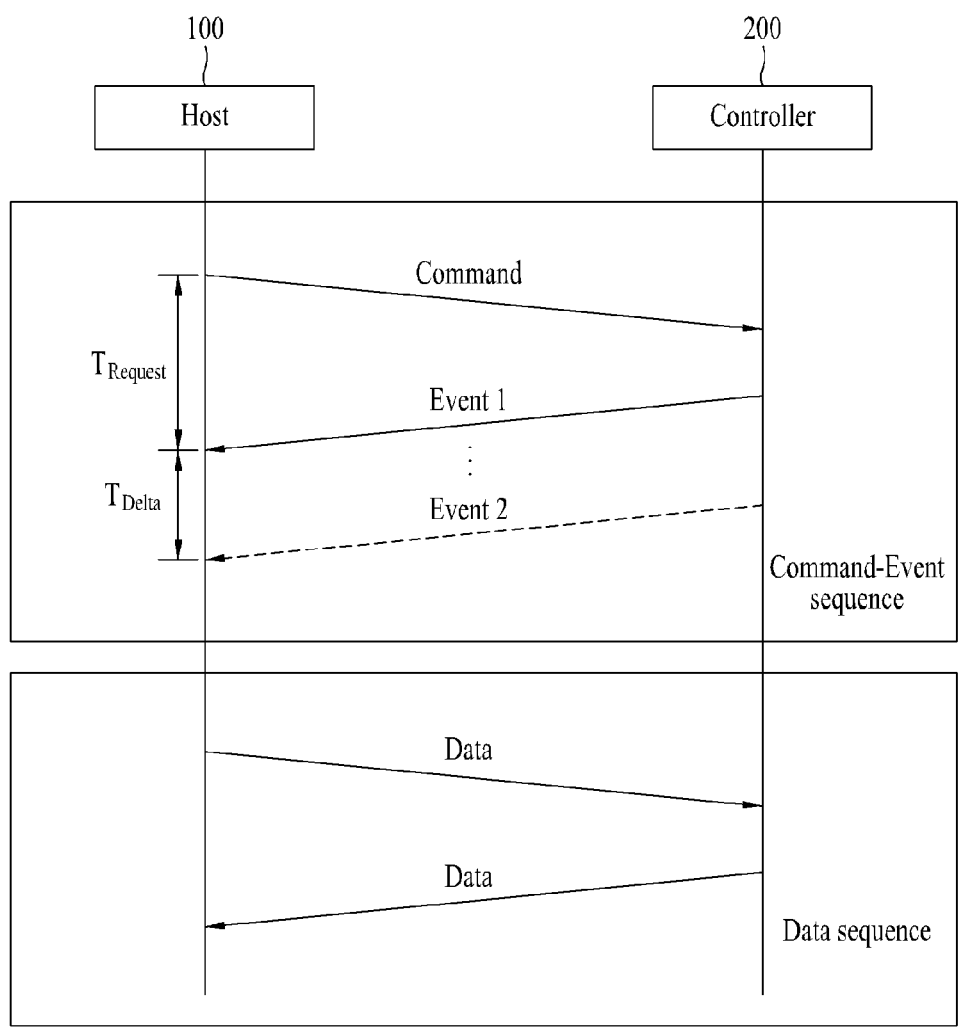

FIG. 3 is a flowchart illustrating a message transmission and reception sequence between a host and the controller according to an exemplary embodiment of the present invention.

FIG. 4 illustrates a table that defines Transaction Identifier for identifying a command sender, when a command is transmitted and received between the host and the controller.

Figure 5:
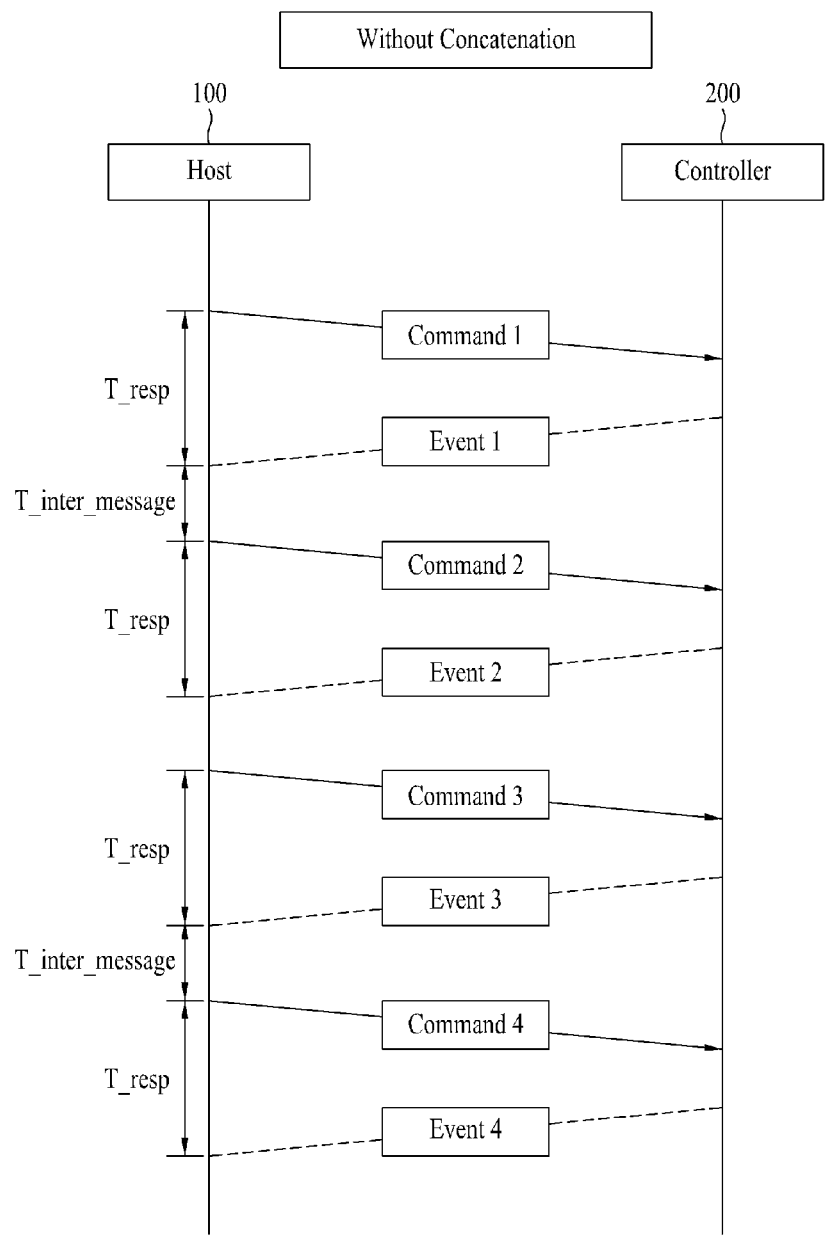

FIG. 5 is a flowchart illustrating a message flow in the case where message concatenation is not performed between the host and the controller.

Figure 6:
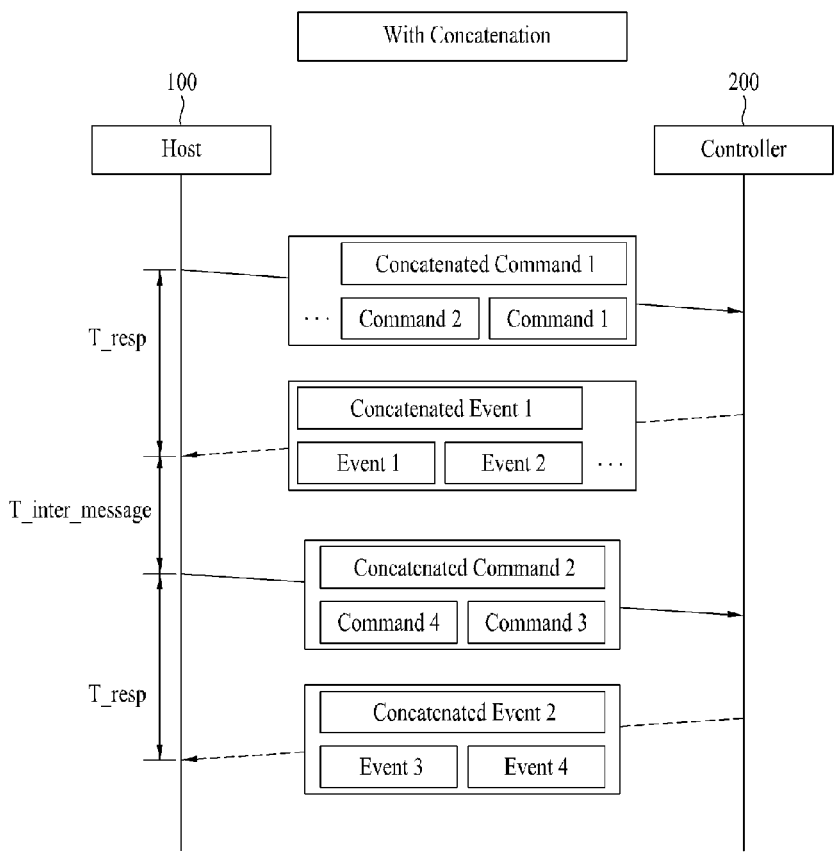

FIG. 6 is a flowchart illustrating a message flow in the case where message concatenation is performed between the host and the controller.

Figure 7:
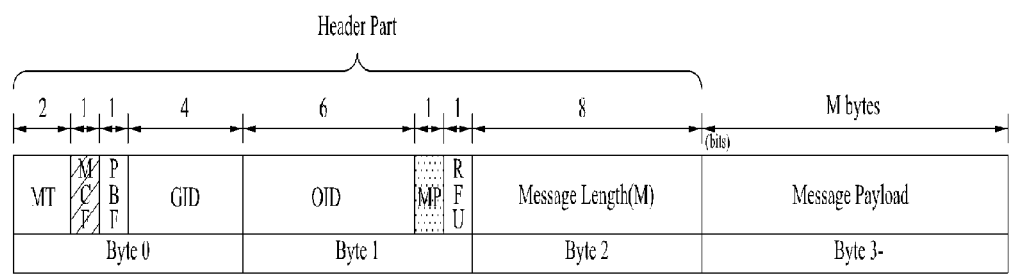

FIG. 7 illustrates a table of fields included in a command or event format according to an exemplary embodiment of the present invention.

FIG. 8 illustrates a table specifying a Message Concatenation Field (MCF) included in the command or event format illustrated in FIG. 7.

FIGS. 9 and 10 illustrate tables specifying a Message Priority (MP) field included in the command or event format illustrated in FIG. 7.

BEST MODE FOR CARRYING OUT THE INVENTION

Reference will now be made in detail to the preferred embodiments of the present invention, examples of which are illustrated in the accompanying drawings.

Although most terms used in the present invention have been selected from general ones widely used in the art, some terms have been arbitrarily selected by the applicant and their meanings are explained in detail in the following description as needed. Thus, the present invention should be understood with the intended meanings of the terms rather than their simple names and meanings.

Wherever possible, the same reference numbers will be used throughout the drawings to refer to the same or like.

Now, embodiments of the present invention will be described in detail with reference to the accompanying drawings so that the present invention will be easily understood and realized by those skilled in the art.

FIG. 1 is a block diagram of an overall system according to the present invention. The following description is made in the context of Near Field Communication (NFC), a short-range wireless connectivity technology that enables simple and safe two-way interactions between electronic devices, by way of example, to which the present invention is not limited.

Referring to FIG. 1, an overall system under the NFC environment may include an NFC device 10 and an external source 20. The NFC device 10 may include a host 100 for controlling a controller 200 and Secure Elements (SEs) 301, 302 and 303, the controller 200 for controlling for communications between the NFC device 10 and the external source 20 under the NFC environment, and the SEs 301, 302 and 303 such as Universal Subscriber Identify Module (USIM) chips, for communicating with the host 100 as well as the controller 200. The NFC device 10 may be an NFC phone or an NFC TV, for example. The external source 20 communicates with the NFC device 10 through the controller 200 in the NFC environment. The external source 20 may include a reader of a transportation card or an access control system, or tag information of a smart poster.

FIG. 2 is a block diagram of the controller 200 illustrated in FIG. 1. Referring to FIG. 2, the controller 200 may include an interface 201, a message manager 202, a buffer 203, a processor 204, and an antenna 205.

The interface 201 is defined as a logical and physical connection path between the controller 200 and the host 100 or between the controller 200 and the SEs 301, 302 and 303. Especially in an exemplary embodiment of the present invention, the interface 201 may be defined as a connection path between the host 100 and the controller 200 under the NFC environment, called an NFC Host Controller Interface (NCI). The interface 201 may be configured in a different manner depending on whether the controller 200 is connected only to the host 100 (single-host architecture) or it is connected to other components such as SEs in addition to the host 100 (multi-host architecture). Although the scope of the NCI does not change, the NCI needs to support additional features in the multi-host architecture, compared to the single-host architecture. Therefore, a required NCI functionality is different in a single- or multi-host environment. While the interface 201 is included in the controller 200 in the exemplary embodiment of the present invention, it may be incorporated into the host 100 or into both the controller 200 and the host 100.

The interface 201 transmits a signal received from the host 100 to a component of the controller 200 or a processed signal received from the component to the host 100. To be more specific, the interface 201 receives a command from the host 100 and transmits the command to the message manager 202. The interface 201 also receives a response to the command from the message manager 202 and transmits the response to the host 100. In the present invention, a message conceptually covers a command and a response. Especially a message flow in the scope of the NCI, i.e. the interface 201 is described.

The message manager 202 generates the response based on the command received from the interface 201. The response may include an initial response indicating an acknowledgment for receiving the command originated from the host 100 or a subsequent response as one of a plurality of responses generated after an initial response to the command. While it has been described that the controller 200 receives a command in the exemplary embodiment of the present invention, it may be further contemplated that the controller 200 transmits a command to the host 100 and the host 100 generates a response to the command. In this case, the message manager 202 generates the command.

Multiple responses may be generated for the command, along with an identifier that identifies the sender. The message manager 202 may generate an identifier identical to an identifier of the command originated from the host 100. As described above, when the controller 200 generates a command and transmits it to the host 100, the message manager 202 may be responsible for generating the identifier of the command.

Besides, the message manager 202 may generate a get command response and a set command response respectively for a get command and a set command received from the host 100. The get command response is to a get command including a parameter identifier for retrieving a parameter value of the controller 200. The get command response has a retrieved value corresponding to the parameter. The set command response is to a set command including a parameter identifier for setting a parameter of the controller 200 to a target value.

The buffer 203 buffers the command originated from the host 100 and the response generated from the message manager 202 and transmits the command and the response to the processor 204.

The processor 204 executes the command received from the buffer 203. The message manager 202 monitors the execution status of the processor 204 and generates the aforedescribed initial response or subsequent response according to the execution status. Also, the message manager 202 generates identifiers for multiple responses, a get command response, and a set command response.

The antenna 205 takes charge of interfacing between the controller 200 and the external source 20, for NFC. The antenna 205 is used for RF transmission and reception.

FIG. 3 is a flowchart illustrating a message transmission and reception sequence between the host 100 and the controller 200 according to an exemplary embodiment of the present invention.

Referring to FIG. 3, a message covers a command, an event as a response to the command, and data. A command-event sequence is illustrated in the upper part of FIG. 3, under which a data sequence is illustrated.

The command-event sequence is based on commands and events. The host 100 may transmit a command to the controller 200 to instruct the controller 200 to perform a specific action. The command may be answered with at least one event.

In FIG. 3, the host 100 transmits a command to the controller 200 and the controller 200 replies to the host 100 with a first event (Event 1) and a second event (Event 2) as responses to the command. Event 1 indicates acknowledgement for receiving the command. And, after the event 1, there is a plurality of responses corresponding to the command as subsequent responses. Event 2 is one of the subsequent responses and especially may be a final response indicating completion of processing the command from the controller 200. In FIG. 3, Event 1 may be implemented as mandatory and Event 2 may be implemented as optional, however, it may be possible implementing Event 1 as optional and Event 2 as mandatory. In other words, Event 1 and Event 2 may be implemented as mandatory or optional responses to the command.

For example, the host 100 uses a command NCI_CORE_RESET_CMD to reset the controller 200. This command can be issued any time after power-up of the controller 200. And the controller 200 transmits an event NCI_CORE_RESET_RESP_EVENT to inform the host 100 that the controller 200 has received the command. An event NCI_CORE_RESET_RESP_EVENT is used to inform the host 100 that the controller 200 has been reset.

The controller 200 is compatible with a plurality of communication protocols such as ISO 14443-A and B, ISO 18092, FeliCa, etc. A time required for searching for an external communication device, i.e. the external source 20 may differ with protocols and be difficult to estimate. Therefore, if a long time is taken to execute the command, Event 1 may be first transmitted as an acknowledgement response and a final response may be transmitted later, so as to render the resource status of the host 100 free.

An event may also be transmitted independently of any command. The host 100 may not response to a command for its power management reasons.

A time required for the message sequence between the host 100 and the controller 200 may be defined as $T_{Request}$ and $T_{Delta}$, as illustrated in FIG. 3. $T_{Request}$ is a time interval the host 100 waits for Event 1 after it transmits the command and $T_{Delta}$ is a time interval the host 100 waits for the subsequent response after it receives Event 1. $T_{Delta}$ may be especially defined as a time interval the host 100 waits for Event 2 after it receives Event 1. In the exemplary embodiment of the present invention illustrated in FIG. 3, the times have been set from the perspective of the host 100 only. The time setting from the perspective of the sender shortens a time delay, thus increasing efficiency, compared to time setting from the perspective of the receiver.

$T_{Delta}$ is used only for a command that has more than one event. At the moment, it may be assumed that for any particular command, there will be only a maximum of two events.

Nevertheless, if there are commands that require more than one additional event, then, another $T_{Delta}$ time will be used for every additional event. And a command is considered to be complete when all the command-specific events are received or when there occurs a timeout on $T_{Request}$ or $T_{Delta}$ as per the case.

While it has been described that the host 100 transmits a command to the controller 200 in the exemplary embodiment of the present invention, it is to be clearly understood that the above-described message sequence and the same definitions of $T_{Request}$ and $T_{Delta}$ are also applicable to the case where the controller 200 transmits a command to the host 100.

According to the data sequence illustrated in the lower part of FIG. 3, the host 100 can transmit data to the controller 200 or vice versa. The data sender, i.e. the host 100 may not require an acknowledgment from the receiver, i.e. the controller 200. Flow control mechanisms may be used during data exchange to handle buffer overflow conditions.

If the controller 200 that has received a command cannot perform the requested action, it may inform the host 100 of the failure using an event status as NCI_STATUS_REJECTED. Reasons for not being able to perform the command could be overflow, limited processing power, and limited resources. A timeout may happen during the NCI scope message sequence if an event doesn't come for the command within the specified $T_{Request}$ or $T_{Delta}$. In such a case, the command may be considered complete and the sender may retransmit the command.

FIG. 4 illustrates a table that defines Transaction Identifier for identifying a command sender, when a command is transmitted and received between the host 100 and the controller 200.

Referring to FIG. 4, a transaction is identified with Transaction Identifier which is one of parameters. The transaction is started with a command and ended when this command is completed. The concept of the transaction is applicable to commands and events having the parameter, Transaction Identifier.

At least one event corresponding to a response of a command may have the same Transaction Identifier of the command which it belongs to. For example, the Transaction Identifier of a command is set to 0xxxxxxxb, as illustrated in FIG. 4, the Transaction Identifier of an event corresponding to a response for the command is also set to the same value 0xxxxxxxb.

The Transaction Identifier value may not be reused as long as the transaction is not completed. For example, if the Transaction Identifier of a command is set to 0xxxxx11b, the Transaction Identifier of another command created before completion of the transaction should not be set to 0xxxxx11b. To prevent the Transaction Identifier of a command from coinciding with that of another command that occurs before the transaction of the command is completed, the value of Transaction Identifier for commands may be set to automatically increment sequentially.

As illustrated in FIG. 4, if the host 100 initiates a transaction, a Transaction Identifier with a Most Significant Bit (MSB) set to 0 may be set. If the controller 200 initiates a transaction, a Transaction Identifier with an MSB set to 1 may be set. The transaction initiators may be identified by different MSBs. If an event is generated independently of a command, not an event being a response for a command, the Transaction Identifier is set to 11111111b, to thereby indicate the status of the transaction.

FIG. 5 is a flowchart illustrating a message flow in the case where message concatenation is not performed between the host 100 and the controller 200.

Referring to FIG. 5, the host 100 transmits four commands, Command 1 to Command 4 to the controller 200 and the controller 200 transmits four events, Event 1 to Event 4 as responses to the respective commands to the host 100. In FIG. 5, $T\_{resp}$ is a communicating time for the host 100 to receive Event 1 after transmitting Command 1 to the controller 200, and $T\_{inter\_message}$ indicates an inter-message time taken for the host 100 to transmit a new command, Command 2 after the communicating time is over. The definitions of $T\_{resp}$ and $T\_{inter\_message}$ are also applied to Command 2, Command 3 and Command 4, and Event 2, Event 3 and Event 4.

FIG. 6 is a flowchart illustrating a message flow in the case where message concatenation is performed between the host 100 and the controller 200.

In an exemplary embodiment of the present invention illustrated in FIG. 6, a message conceptually includes a command and an event as a response to the command.

Referring to FIG. 6, the host generates a first concatenated command, Concatenated Command 1 by combining Command 1 and Command 2 and transmits Concatenated Command 1 to the controller 200. The host 100 also generates a second concatenated command, Concatenated Command 2 by combining Command 3 and Command 4 and transmits Concatenated Command 2 to the controller 200. Command 1 and Command 2 or Command 3 and Command 4 may have the same priority regarding a process order because one command does not affect the process order of the other command, only when commands of the same priority are concatenated. For example, if Command 1 in Concatenated Command 1 is a reset command, the system may be set down without processing Command 2. Upon receipt of Concatenated Command 1, the controller 200 generates a first concatenated event, Concatenated Event 1 for Concatenated Command 1 by combining Event 1 and Event 2 and transmits Concatenated Event 1 to the host 100. Also, upon receipt of Concatenated Command 2, the controller 200 generates a second concatenated event, Concatenated Event 2 for Concatenated Command 2 by combining Event 3 and Event 4 and transmits Concatenated Event 2 to the host 100.

As in the exemplary embodiment of the present invention illustrated in FIG. 6, when message concatenation is carried out, the amount of time required for transmission of the messages gets reduced significantly. Therefore, overall transmission efficiency is increased. For example, an exchanging time required for exchanging a concatenated command with a concatenated response is defined by a half reduced time rather than the amount of time required for exchanging non-concatenated commands with non-concatenated responses. An exchanging time, $T\_{resp}$ is a communicating time for the host 100 to receive Concatenated Event 1 after transmitting Concatenated Command 1 to the controller 200. $T\_{resp}$ is also a communicating time for the host 100 to receive Concatenated Event 2 after transmitting Concatenated Command 2 to the controller 200. In FIG. 6, the number of $T\_{resp}$ occurrences is half reduced, compared to that of $T\_{resp}$ occurrences in FIG. 5. Another exchanging time, $T\_{inter\_message}$ indicates an inter-message time for the host 100 to transmit a new concatenated command, Concatenated Command 2 after the communicating time is over. In FIG. 6, the number of $T\_{inter\_message}$ occurrences is half reduced, compared to that of $T\_{inter\_message}$ occurrences in FIG. 5. Therefore, $T\_{resp}$ and $T\_{inter\_message}$ are all reduced by half in FIG. 6, compared to $T\_{resp}$ and $T\_{inter\_message}$ in FIG. 5.

Concatenated messages are processed in the order in which they are received. Commands or events in concatenated commands or events may also be processed in the order in which they are received. However, the controller 200 can start to process a message before it finishes processing the previously received messages.

For processing a concatenated command or concatenated event, the controller 200 can buffer one or more messages. The controller 200 can start to process a received concatenated message before it received the entire concatenated messages. And the controller 200 can start to process a received command, Command 1 or Command 2 before it receives the entire concatenated command, Concatenated Command 1. The host 100 can start to process a received event, Event 1 or Event 2 before it receives the entire concatenated event, Concatenated Event 1.

A command RESET (not shown) takes the highest priority when processing a concatenated command having the command RESET. When the command RESET is processed in the controller 200, the controller 200 reboots itself and returns to an original status of message controlling.

FIG. 7 illustrates a table of fields included in a command or event format according to an exemplary embodiment of the present invention.

A command or event format used in the present invention includes a Message Type (MT) field and an Information field (not shown). The MT field indicates and specifies the type of a command or event. The MT field may be 2 bits and the Information field depends on the value of the MT field. If the MT field is set to 01b, the Information field may include information about data. Also, if the MT field is set to 00b, the Information field may include information about a command or event.

FIG. 7 is about an MT field set for a command or event. A Header Part may include the MT field, a Message Concatenation Field (MCF), a Packet Boundary Flag (PBF) field, a Group Identifier (GID) field, an Opcode Identifier (OID) field, a Message Priority (MP) field, Reserved for Future Usage (RFU), and a Message Length (ML) field. Message Payload may include actual data of the message. The MCF and the MP field will be described later with reference to FIGS. 8, 9 and 10.

The PBF field is used to indicate segmentation and reassembly information about a message. The GID field is used to indicate the group of different commands and events. Individual groups are identified by group identifiers. The OID field is used to identify a command. The OID field may be unique inside a group which is indicated by the GID field. The ML field indicates the number of bytes used for the Message Payload. The ML field may be 8 bits in length and can take values from 0 to 255.

FIG. 8 illustrates a table specifying the MCF field included in the command or event format illustrated in FIG. 7.

Referring to FIG. 8, the MCF is used to indicate support of concatenation between commands and events. If the MCF is set to 0b, it indicates that there is no concatenation between commands or events, or the command or event including the MCF set to 0b is the last segment of the concatenated command or concatenated event. If the MCF is set to 1b, it indicates an additional command or event which is part of the concatenated command or event follows the current command or event.

FIGS. 9 and 10 illustrate tables specifying the MP field included in the command or event format illustrated in FIG. 7.

The NFC device 10 communicates with the external source 20 by NFC in a card emulation mode, a read/write mode, or a peer-to-peer mode. In the card emulation mode, information of the NFC device 10 is read by the external source 20, which corresponds to a reader of a transportation card or access control system. The NFC device 10 reads information of the external source 10 in the read/write mode. In this case, the NFC device 10 reads tag information of a smart poster. The peer-to-peer mode refers to a mode in which two NFC devices 10 transmit and receive information with each other. Business cards or schedules are exchanged in the peer-to-peer mode. Besides the above-described modes, NFC may be made in many other modes and the controller 200 selects a mode based on priority information included in a message.

Each command and event defined in the NCI may have its message priority value. Message priority could determine the processing priority at the receiver. The message priority does not have to explicitly impact the transmission order of a message at the sender.

Message priority is supported by an indication of a field in a message header field. Each command and event message carries an MP field within its header part. Upon receipt of a message, the receiver checks the priority of the message by inspecting the MP field.

The MP field is used to indicate the priority level of a message. As illustrated in FIG. 9, if the MP field is set to 0b, it indicates that the message including the field set to 0b has low priority. If the MP field is set to 1b, it indicates that the message including the field set to 1b has high priority. While one bit is assigned to the MP field, the MP field may occupy two or more bits. In this case, values listed in FIG. 10 may be available to the MP field. The 2-bit MP field may indicate no priority, low priority, medium priority, and high priority by different combinations of the 2 bits. A default value is marked as 00 if the 2 bits are not used.

According to the priority value of the received message, the receiver processes the message. If the message is currently being processed, the receiver completes the processing of the current message, irrespective of the priority of a newly arrived message. After the current message processing is completed, the receiver then processes the next messages according to their priority levels.

While the exemplary embodiments of the present invention have been described above in the context of the controller 200 being a command receiver, they are also applicable to the case where the controller 200 generates a command and transmits the command with parameters to the host 100.

Mode for the Invention

Various embodiments have been described in the best mode for carrying out the invention.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for controlling at least one message including at least one command and response corresponding to the at least one command, the method comprising:
    generating a concatenated command message by combining multiple commands,
    wherein the multiple commands have a same priority, and
    wherein one command of the multiple commands does not affect a process order of the other commands;
    transmitting the concatenated command message to a receiver; and
    receiving a concatenated response message corresponding to the concatenated command message from the receiver,
    wherein the concatenated response message is generated by combining multiple responses,
    wherein the at least one command includes a message concatenation field and a message priority field, the message concatenation field being used to indicate a support of the concatenation of the at least one message and the message priority field being used to indicate a priority level of the at least one message, and
    wherein the message concatenation field and the message priority field are included in a header part of the at least one command.

2. The method of claim 1, wherein the message concatenation field indicates that there is an additional message which is a part of concatenated messages if the message concatenation field is set to "1".

3. The method of claim 1, wherein the message concatenation field indicates that there is no concatenation of messages or a message is the last segment of concatenated messages if the message concatenation field is set to "0".

4. The method of claim 1, wherein an exchanging time required for exchanging the concatenated command and response message is defined by a half reduced time rather than the amount of time required for exchanging a command and response which are not concatenated.

5. The method of claim 4, wherein the exchanging time includes a communicating time to receive the concatenated response message after sending the concatenated command message to the receiver.

6. The method of claim 5, wherein the exchanging time includes an inter-message time indicating for sending a new concatenated command message after the communicating time is over.

7. The method of claim 1, wherein the concatenated command message includes reset information, the reset information having a highest priority when processing the concatenated command message.

8. A method for controlling at least one message including at least one of command and response, the method comprising:
- receiving a concatenated command message from a sender, wherein the concatenated command message is formed by combining multiple commands having a same priority, and
- wherein one command of the multiple commands does not affect a process order of the other commands;
- processing the concatenated command message according to an order in which the multiple commands are received;
- generating a concatenated response message corresponding to the concatenated command message by combining multiple responses; and
- transmitting the concatenated response message to the sender
- wherein the at least one command includes a message concatenation field and a message priority field, the message concatenation field being used to indicate a support of the concatenation of the at least one message and the message priority field being used to indicate a priority level of the at least one message, and
- wherein the message concatenation field and the message priority field are included in a header part of the at least one command.

9. An apparatus for controlling at least one message including at least one command and response corresponding to the at least one command, the apparatus comprising:
- an interface configured to receive a concatenated command message being formed by combining multiple commands having a same priority, wherein one command of the multiple commands does not affect a process order of the other commands,
- a processor configured to process the concatenated command message according to an order in which the multiple commands are received,
- a message manager configured to generate a concatenated response message corresponding to the concatenated command message by combining multiple responses, and
- the interface configured to transmit the concatenated response message,
- wherein the at least one command includes a message concatenation field and a message priority field, the message concatenation field being used to indicate a support of the concatenation of the at least one message and the message priority field being used to indicate a priority level of the at least one message, and
- wherein the message concatenation field and the message priority field are included in a header part of the at least one command.

* * * * *